United States Patent Office 2,792,283
Patented May 14, 1957

2,792,283

PROCESS OF MAKING SODIUM BICARBONATE FROM SODIUM HYDROXIDE CELL LIQUOR

Archie Hill, Painesville, Ohio, and Ward J. Burkholder, Houston, Tex., assignors to Diamond Alkali Company, Cleveland, Ohio, a corporation of Delaware No Drawing. Application January 28, 1953,
Serial No. 333,828

5 Claims. (Cl. 23—64)

This invention relates to the preparation of alkali metal bicarbonates, and more particularly relates to the preparation of sodium bicarbonate especially from relatively dilute caustic soda solutions.

The production of relatively dilute caustic soda solutions in the modern diaphragm-type electrolytic cell is the first step in a widely practiced commercial method of manufacture of either concentrated sodium hydroxide solutions or anhydrous caustic soda for various uses in the arts. There are times, however, when the supply of this commodity, either in the form of its normal solutions of commerce, such as 50% or 73% solutions, or in the anhydrous form, is in excess in the market whereby the same cannot move in normal channels of trade. Under these circumstances, the art had directed its efforts to various expedients for avoiding the total waste of the caustic soda so manufactured. The difficulty, of course, in the manufacture of caustic soda by this means is that normally the art may not completely avoid the manufacture of this material as it is a concomitant product with chlorine, produced by the electrolysis of brine in electrolytic cells, and one cannot produce the chlorine without producing an equimolar portion of sodium hydroxide.

While sodium hydroxide may be compared as a commodity from a market standpoint with soda ash, i. e., sodium carbonate, especially when one considers both commodities from the standpoint of their $Na_2O$ content, the price differential in markets of the present day between sodium hydroxide and sodium carbonate is an outstanding feature of the problem of disposing of excess sodium hydroxide. Thus, sodium hydroxide, based upon its $Na_2O$ content, is considerably more expensive than sodium carbonate to buy and use from the standpoint of the user of a given unit quantity of $Na_2O$. As a result of this commercial phenomenon, the user of $Na_2O$ normally purchases sodium carbonate, i. e., soda ash, in preference to sodium hydroxide both because of price advantage and because sodium hydroxide produced by diaphragm cells, unless substantially purified, possesses impurities which decrease its value as a bearer of $Na_2O$ content. Therefore, even though sodium carbonate is lower in $Na_2O$ content, it nevertheless is a cheaper commodity, considering its $Na_2O$ content. In addition, it is normally obtained in purer form with respect to its $Na_2O$ content than sodium hydroxide. It is apparent that the sodium hydroxide produced by the diaphragm cell method, despite the need for the chlorine produced at the same time, is a commodity which can become marginal and under unfavorable economic conditions, could even become a distress commodity.

The problem, therefore, of modifying sodium hydroxide, especially produced by the diaphragm cell method, in a manner to change it ultimately into sodium carbonate or sodium bicarbonate, the sodium bicarbonate itself being an article of commerce, is one to which the art has addressed itself for a considerable period of time. It will be appreciated by those skilled in the art that if the concentration cost normally involved in the production of commercial sodium hydroxide solutions, such as 50% or 73% solutions, is included in the cost of obtaining sodium bicarbonate or indeed sodium carbonate from the sodium hydroxide, then in all probability the process of obtaining sodium carbonate from sodium hydroxide cannot be a commercial possibility. Accordingly, it is necessary that the process of producing sodium bicarbonate from sodium hydroxide be based upon processing weak sodium hydroxide solutions, such as that recovered from the diaphragm cell itself, without further treatment.

This problem of avoiding the concentration step itself presents other difficulties, in that normally the carbonation of the effluent catholyte from a diaphragm-type cell, which contains a concentration of the order of but 8%–11% of sodium hydroxide, is productive either of totally soluble materials which themselves cannot readily be recovered or of such fine crystals of sodium bicarbonate as to render the material unrecoverable by ordinary means. Since all of the commodities under discussion herein are of relatively inexpensive character, and since, moreover, the process of the present invention is particularly applicable to dilute solutions of sodium hydroxide, which material cannot normally be disposed of, it will be appreciated that if extraordinary steps of recovery are necessary to obtain sodium bicarbonate from the dilute sodium hydroxide solution, then again the process will fail of commercial acceptance because of that increased cost.

The prior art has proposed the adoption of sundry expedients for the production of sodium bicarbonate from sodium hydroxide solutions as recovered from diaphragm-type cells, one specific proposal being to resaturate the catholyte brine obtained from the cell with respect to sodium chloride in order to increase the yield of sodium bicarbonate ultimately obtained by carbonation to a reasonable percentage of the actual available sodium hydroxide in the solution. Whatever advantage this proposal may have, it of necessity fails of commercial acceptance because of the added expense of the step of treating the sodium hydroxide-containing brine from the cell with sodium chloride prior to the carbonation step. In addition, this proposal, and many others like it, envision the use of highly concentrated carbon dioxide in the contacting of the sodium hydroxide-containing brine with carbon dioxide, which proposals in and of themselves normally cannot enjoy commercial acceptance since highly concentrated carbon dioxide is, in considering the character of the chemicals under discussion herein, a relatively expensive material.

It is apparent from the discussion above, therefore, that in order for one to obtain sodium bicarbonate from the catholyte effluent of diaphragm cells on a basis which represents anything reasonably approaching an economic operation, one must do so with the minimum of manipulative steps and with the cheapest materials possibly available.

One of the problems, in addition, faced in the obtaining of sodium bicarbonate in this manner is that the bicarbonate crystals must, in order to be commercially acceptable, be comparable in crystal size to those normally obtained in the carbonating towers of the ammonia-soda process. Such crystals are normally tested for their crystal size by a purely practical means of examining their settling rate in a stated concentration and in a stated volume. If the crystals obtained from the carbonation of the cell liquor effluent from diaphragm cells approaches the settling rate under the same conditions as that of ammonia-soda crystals, then it is a foregone conclusion that those crystals may be used as equivalents to the bicarbonate crystals obtained in the Solvay ammonia-soda process and could, for example, be calcined in the Solvay ammonia-soda calcining system for the purpose of obtaining light soda ash therefrom or could be otherwise treated in the manner of Solvay ammonia-soda bicarbonate crystals.

It is an object of the present invention to provide a method for carbonating the sodium hydroxide content of dilute sodium hydroxide solutions, such as cell liquor effluent, especially that obtained from electrolytic chlorine-caustic cells, such as diaphragm cells, to obtain therefrom high yields of sodium bicarbonate crystals of a size comparable to those obtained by normal operation of the Solvay ammonia-soda process.

It is a further object of the present invention to provide a method for carbonating the catholyte liquor effluent from diaphragm-type electrolytic chlorine-caustic cells in a manner which permits the use of concentrated carbon dioxide, if desired, but which equally readily permits the use of relatively dilute carbon dioxide-containing gases, such as off gases from kiln operations or the like, while at the same time providing sodium bicarbonate crystals of a size equivalent to those normally obtained in the carbonating towers of the ammonia-soda system.

A further object of this invention is to provide the optimum conditions of temperature and pressure under which cell liquor effluent from diaphragm-type electrolytic chlorine-caustic cells shall be contacted with carbon dioxide to produce crystals of a size rendering themselves readily susceptible to separation from the mother liquor of the solution and being in crystal form and size comparable to those normally obtained in the carbonating towers of the ammonia-soda process.

Further objects of the invention will suggest themselves to those skilled in the art as the further disclosure thereof continues throughout the specification.

In accordance with the present invention, it has been found that if one carbonates the cell effluent from a diaphragm electrolytic chlorine-caustic cell or equivalent dilute sodium hydroxide solutions, which solutions will be referred to hereinafter, for convenience, as cell liquor, and which solutions contain from between about 8% to about 11% of sodium hydroxide, and in any case not substantially in excess of 25%, with either concentrated carbon dioxide or dilute carbon dioxide-containing gas under pressure and at a temperature sufficient to insure that the rate of crystal growth of sodium bicarbonate exceeds the rate of crystal formation of that substance, then large crystals are formed and it makes very little difference how one treats the system after the crystals form with respect to modifying the crystal size. The present invention contemplates the handling of the system in any manner to insure a high rate of crystal growth compared to the rate of crystal formation.

The reaction involved, while probably complex, may be written in simplest terms as follows:

$$NaOH + CO_2 \rightarrow NaHCO_3$$

It is apparent that sodium bicarbonate has some solubility in the system of this invention, even under the conditions of temperature and pressure optimumally prescribed. However, where the conditions of reaction insure that crystals of bicarbonate grow faster than new nuclei of bicarbonate form, and where concentrations of reactants and reaction conditions insure that the reaction above shall run substantially entirely to the right, then a yield of commercially usable crystals approaching theory is recovered.

In accordance with the present invention, it has been found that while both temperature and pressure conditions are significant factors in treatment of cell liquor in the manner described, it is probable that the temperature should be maintained in excess of 65° C., and preferably below 100° C., ideally at about 80° C., in order to insure a relatively high rate of crystal growth as compared to the rate of crystal formation or nucleation.

Similarly, it has been found that while the pressure may be varied, about 40 p. s. i. gauge of $CO_2$ is desirable where 100% $CO_2$ is employed. Pressures in the range from 20–60 p. s. i. gauge and above will also produce crystals of a reasonable size. Pressures as high as 250 p. s. i. gauge are desirable if relatively dilute carbon dioxide-containing gases are employed, such as off gases from kiln operations and the like, in order to obtain partial pressures of $CO_2$ in such systems within the range mentioned above.

With respect to the size of the crystals, it is known that normal ammonia-soda process bicarbonate crystals as obtained in a slurry from a carbonating tower, settle to "a good compact sludge" in a 100-ml. graduate in a period of about 4 minutes. These crystals are grainy and after settlement, occupy no more than 50 mls. of the graduate. Since these crystals are the precise crystals which are subsequently processed in the ammonia-soda process, this provides a very handy rule of thumb for measuring the size of the crystals obtained in the carbonation system of the present invention and for comparing the crystals obtained with those obtained in the ammonia-soda process. When the crystals of this invention are obtained in a system operated within the limits set forth above, crystals are obtained which, when measured in accordance with the standards set forth above with respect to ammonia-soda crystals, settle in 3 minutes or less to the same extent as the ammonia-soda crystals, i. e., about 50 mls. in a 100-ml. graduate.

While some minor variations appear to obtain in the manner of introducing the carbon dioxide into the closed system, i. e., as to rate of introduction of the $CO_2$ and the like, there appears to be little difference so long as the ultimate conditions are obtained, that is, the conditions of temperature and pressure, in the closed system. Moreover, while time of introduction is of no process significance, it will normally be preferred in commercial practice to introduce all of the carbon dioxide necessary to complete the reaction to bicarbonate in but a few minutes.

Those skilled in the art will appreciate that any suitable closed system may be employed, depending upon the size of the operation, all the way from laboratory autoclaves to large pressure systems, such as towers or the like, which would normally be employed for the production of sodium bicarbonate in this manner.

It has been found that in employing a 5-liter autoclave and 2 liters of cell liquor containing the stated concentration of sodium hydroxide, and thus leaving 3 liters of unoccupied space within the autoclave, with a suitable paddle-type agitator operating at about 400 R. P. M., and by feeding carbon dioxide to an extent necessary to supply the stoichiometric requirements of sodium hydroxide to sodium bicarbonate, the reaction normally can be completed in a period of less than 2 hours. It will be appreciated by those skilled in the art that where large continuous operations are envisioned, the reaction time, so long as it does not become unreasonable, i. e., a matter of many, many hours or days, will be to a considerable extent optional and a matter of engineering design. Upon completion of the carbonation under the conditions of the invention, the manner and time of cooling the reaction mass is optional and without effect upon crystal size.

In order that those skilled in the art may more clearly understand the precise character of the invention, the following specific examples are offered:

In Examples I through V, a 5-liter autoclave is charged with 2 liters of catholyte effluent from a diaphragm-type electrolytic cell, containing between 106.2 and 109.4 grams per liter of total alkalinity as NaOH and 184.3 to 188.7 grams per liter of NaCl. The autoclave is suitably equipped with an anchor-type paddle, which runs at 400 R. P. M. and which is operated during the time the $CO_2$ is introduced into the autoclave. In all cases, 10% excess of $CO_2$ is introduced into the autoclave over a period of time as stated in each example.

Example I

In this example, which is not in accord with the conditions of the invention and is included for comparison only, the system is heated to 45° C. and the temperature is maintained by slowly feeding $CO_2$ gas. In this manner, the pressure rises to 100 p. s. i. of $CO_2$ during 2¾ hours; the resulting crystals settle at the rate of 1 ml. per minute in accordance with the test set forth above. It will be recognized that this settling rate is not of a commercial character.

Example II

In this example, the temperature is held at 65° C. and the pressure is 40 p. s. i. The crystals obtained after 2¾ hours settle at the rate of 30 mls. per minute, which it will be observed is faster than required in accordance with the comparative ammonia-soda crystals as described above.

Example III

The autoclave is held at 65° C. under 40 p. s. i. of $CO_2$, the difference from Example II being that the autoclave is rapidly pressured to 40 p. s. i. and held there. The crystals obtained after 2 hours settle at 15 mls. per minute, which it will be appreciated is within the commercial ammonia-soda range but not as satisfactory as Example II.

Example IV

The autoclave is held at 80° C. under 40 p. s. i. of carbon dioxide. The carbon dioxide is rapidly fed into the autoclave over a period of 20 minutes; after one-half hour, the batch is rapidly cooled at a rate of 108° C. per hour. Very large crystals result which completely settle in less than 45 seconds. It will be appreciated that this is well within the commercial range as stated above. Moreover, the shorter overall time is preferable to the time cycle of Example II.

This example tends to illustrate the fact that the treatment following the completion of the carbonation reaction, i. e., rapid cooling, is of no consequence.

Example V

A batch is treated with carbon dioxide-containing gas containing 18% $CO_2$, the remainder of the gas being inert. A total pressure of 220 p. s. i., and thus 40 p. s. i. partial pressure of $CO_2$ is obtained in the autoclave. The temperature is maintained throughout at 80° C. Carbonation is continued for 3½ hours, including the cooling period, after which crystals, which settle too rapidly for the rate to be measured, are recovered. It is apparent that crystals which have this rapid settling rate are well within the commercial range described above for ammonia-soda crystals.

Example VI

A pair of carbonating vessels are set up, one of which is adapted to receive a charge of catholyte cell liquor effluent of the type treated in Example I and to receive carbonation up to 60% of that stoichiometrically necessary to convert sodium hydroxide to sodium bicarbonate. Carbon dioxide is introduced to a pressure of 40 p. s. i. of $CO_2$ and a temperature of 80° C. is maintained. The batch is then dumped and is found to contain no crystals whatsoever. The batch is sent to a second carbonator, where the carbonation is completed to the stoichiometric amount, the temperature and pressure being as before. Crystals which settle more rapidly than the standard ammonia-soda crystals are obtained.

Example VII

A set-up as employed in Example VI is used, except that the carbon dioxide employed in the first carbonation treatment is of 18% $CO_2$ concentration, the remainder being inert, and pressure is maintained at about 100 p. s. i. Thereupon, the material thus carbonated is removed from the first carbonator and sent to a second carbonator, where essentially pure carbon dioxide is employed to complete the carbonation. Again, the crystals are of a size in the commercial range.

Example VIII

Cell liquor is fed to the top of a trickle tower, first-stage reactor, while 18% $CO_2$ flue gas is simultaneously fed to the bottom of the tower. Feed rates, pressure, and tower height are maintained so that the solution is withdrawn from the tower at 80° C. and carbonation is to a point representing 58% of completion of the bicarbonation. Pressure in the vicinity of 40 p. s. i. is employed in the tower.

This solution is fed to a suitably agitated, second stage reactor which is pressured with essentially pure $CO_2$ gas to 40 p. s. i. and held at that pressure at about 80° C. for about 15 minutes. The resulting slurry is rapidly cooled to 30° C. and the crystals separated by filtration. After washing, the crystals are calcined and the essentially pure $CO_2$ gas liberated. This gas is recycled to the second stage reactor.

Example IX

Cell liquor is carbonated to 58% of completion in accord with Example VIII and is fed to a second stage reactor which is suitably agitated. Carbonation is completed at 80° C. under 220 p. s. i. (total pressure) using an 18% $CO_2$ gas mixture. The $CO_2$-weak gas is fed rapidly through this stage so that, despite absorption and reaction of a portion of the $CO_2$ content, the composition of the gas within the reactor is maintained at a value closely approaching 18% $CO_2$. The resulting bicarbonate product can be used for any purpose as recycle gas is not necessary.

The weak gas which is vented from the second stage reactor is fed to the first stage reactor at the base while cell liquor is fed to the top. This stage is also operated at 80° C. and 220 p. s. i. total pressure. Reactant feed rates are so controlled that the solution obtained is bicarbonated to the extent of 58% and may be stored or fed to the second stage reactor.

It is obvious that a single bubble cap type tower, such as is commonly used in the ammonia-soda process, could also be used as a single-stage reactor employing either weak or pure $CO_2$ gas at the appropriate feed rates, temperature, and pressures.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of obtaining sodium bicarbonate crystals of a filterable size from the effluent from a diaphragm-type electrolytic chlorine-caustic cell, which consists essentially of contacting said effluent with carbon dioxide in a closed system to provide a pressure of carbon dioxide of between 30 and 50 p. s. i. gauge, and at a temperature in excess of 65° C.

2. The method of forming sodium bicarbonate crystals of a filterable size and form comparable to those obtained by ordinary operation of an ammonia-soda system, from a sodium hydroxide solution of less than 25% concentration, which consists essentially of contacting said sodium hydroxide solution with carbon dioxide at a pressure of carbon dioxide of the order of 30–50 p. s. i. gauge and at a temperature in excess of 65° C. until the filterable crystals are obtained.

3. The method of claim 2 wherein the temperature is maintained between 65° and 100° C.

4. The method of claim 2 wherein the pressure is maintained at about 40 p. s. i. and the temperature is held at about 80° C.

5. The method of claim 2 which includes partially carbonating said dilute sodium hydroxide solution with carbon dioxide-containing gas of one concentration and completing the carbonation with carbon dioxide gas of a different concentration.

References Cited in the file of this patent

UNITED STATES PATENTS

| 1,865,832 | Chesny | July 5, 1932 |
| 1,865,833 | Chesny | July 5, 1932 |
| 2,383,674 | Osborne | Aug. 28, 1945 |

FOREIGN PATENTS

| 865 | Great Britain | of 1854 |